(12) United States Patent
Potenza et al.

(10) Patent No.: US 7,125,446 B2
(45) Date of Patent: Oct. 24, 2006

(54) YELLOW DYES FOR INK JET INKS

(75) Inventors: Joan C. Potenza, Rush, NY (US);
Steven Evans, Rochester, NY (US);
Ellen J. Pyszczek, LeRoy, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/994,593

(22) Filed: Nov. 19, 2004

(65) Prior Publication Data
US 2006/0107868 A1 May 25, 2006

(51) Int. Cl.
*C09D 11/02* (2006.01)
(52) U.S. Cl. .............. 106/31.5; 106/31.48; 106/31.58
(58) Field of Classification Search .......... 106/31.5, 106/31.58, 31.48; 534/769
See application file for complete search history.

(56) References Cited

U.S. PATENT DOCUMENTS

| | | | |
|---|---|---|---|
| 4,425,162 A | 1/1984 | Sugiyama et al. | 106/31.36 |
| 4,685,934 A | 8/1987 | Benguerel et al. | 534/740 |
| 5,144,015 A * | 9/1992 | Chapman | 534/752 |
| 5,391,720 A * | 2/1995 | Mikoshiba et al. | 534/760 |
| 6,331,204 B1 * | 12/2001 | Carr et al. | 106/31.27 |
| 6,464,767 B1 | 10/2002 | Evans et al. | 106/31.5 |
| 6,468,338 B1 | 10/2002 | Evans et al. | 106/31.5 |
| 6,552,008 B1 * | 4/2003 | Duffy et al. | 534/769 |
| 6,582,502 B1 | 6/2003 | Fujiwara | 106/31.48 |
| 6,739,715 B1 | 5/2004 | Harada et al. | 106/31.27 |
| 2001/0029869 A1 | 10/2001 | Fujiwara | 106/31.49 |
| 2003/0089274 A1 | 5/2003 | Nishita et al. | 106/31.48 |
| 2004/0020408 A1 | 2/2004 | Yabuki | 106/31.27 |
| 2004/0050291 A1 | 3/2004 | Taguchi et al. | 106/31.27 |
| 2004/0094064 A1 * | 5/2004 | Taguchi et al. | 106/31.3 |
| 2004/0129172 A1 | 7/2004 | Harada et al. | 106/31.46 |
| 2005/0126431 A1 * | 6/2005 | Potenza et al. | 106/31.5 |
| 2005/0229810 A1 * | 10/2005 | Blease et al. | 106/31.5 |

OTHER PUBLICATIONS

"Filtration and Reciprocity Effects on the Fade Rate of Inkjet Photographic Prints," proceedings of IS&T NIP16: International Conference on Digital Printing Technologies, Vancouver, BC, D.E. Bugner and C. Suminski, Oct. 2000.

* cited by examiner

*Primary Examiner*—Helene Klemanski
(74) *Attorney, Agent, or Firm*—Sarah Meeks Roberts

(57) ABSTRACT

This invention relates to a yellow ink composition for ink jet printing comprising a dye represented by Formula I, water and a humectant:

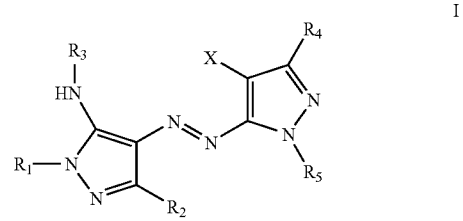

wherein:
$R_1$ and $R_5$ independently are hydrogen or a substituted or unsubstituted alkyl, aromatic or heterocyclic group;
$R_2$ and $R_4$ independently are hydrogen or a non-metallic substituent;
$R_3$ is hydrogen or a substituted or unsubstituted alkyl, acyl, sulfonyl, aromatic or heterocyclic group;
and X is an electron withdrawing group;
with the proviso at least one of $R_1$, $R_2$, $R_3$, $R_4$ and $R_5$ comprises a group capable of imparting water solubility to the dye.

29 Claims, No Drawings

YELLOW DYES FOR INK JET INKS

FIELD OF THE INVENTION

The present invention relates to water-soluble pyrazole-azo-aminopyrazole dyes and their use in inks, particularly ink jet inks.

BACKGROUND OF THE INVENTION

Ink jet printing is a non-impact method for producing images by the deposition of ink droplets in a pixel-by-pixel manner to an image-recording element in response to digital signals. There are various methods that may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant that is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic solvents and high boiling organic solvents, such as hydrocarbons, esters, ketones, etc.

Materials used in inkjet printing inks must have the correct properties to provide an ink which is stable, possesses good printing properties and provides an image with good color, sharpness and image stability. Many dyes are known and used in inkjet printing inks. Many have some or most of these desirable properties but it is very difficult to find a dye which possesses all of the above attributes. Ink jet inks generally contain a dye that is soluble in an ink vehicle such as water or a mixture composed of water and a known water soluble or water miscible organic solvent. Typically the dyes are chosen from acid, direct and reactive dyestuffs developed for the dyeing of natural fibers such as paper, wool and cotton. Water solubility of these dyes is due to the incorporation of negatively charged substituent groups such as sulfo or carboxy. Dyes are degraded by ozone and light and their stability with regard to these two agents can differ depending on media and ink composition. There is a great need to develop dye-based inks which have high optical densities on receivers and also superior lightfastness and colorfastness when printed on different types of media, in particular, fast drying or porous media as well as plain paper.

The yellow dyes currently in commercial aqueous ink formulations are less than optimal in one property or another. They are used because they achieve an acceptable but not superior balance of features. Some examples of such dyes are Direct yellow 132 (CAS 10114-86-0) and Direct yellow 86 (CAS 50295-42-3), which have good stability toward ozone and light but have less than optimal hue, acid yellow 23 (CAS 1934-21-0) and acid yellow 17 (CAS 6359-98-4) which have good hue and ozone fastness, but poor light stability. U.S. Pat. Nos. 6,468,338 and 6,464,767 disclose water-soluble azoindole dyes for use in ink jet printing including dyes derived from diazotizable heteroaromatic amines. However, there is a problem with some of these dyes in that they do not have sufficient stability to atmospheric ozone, especially on porous fast drying media. This property on porous media is important because such fast drying media is becoming more and more popular and while most dyes are stable on gel-based or swellable media, porous media are more stringent in their demand for a high level of stability.

While glossy, porous ink-receiving layers (IRL's) have the ability to absorb high concentrations of ink instantly, they suffer from image fastness problems, such as fading due to exposure to radiation by daylight, tungsten light, fluorescent light, or ozone, as described by D. E. Bugner and C. Suminski, "Filtration and Reciprocity Effects on the Fade Rate of Inkjet Photographic Prints", Proceedings of IS&T's NIP 16: International Conference on Digital Printing Technologies, Vancouver, BC, October 2000. It is believed that the poor image fastness may be attributed to the greater permeability of the porous IRL's to oxygen and/other airborne reactants such as ozone.

U.S. Pat. No. 4,685,934 describes water-soluble pyrazole azo aminopyrazole dyes for use in the dyeing of textiles but there is no disclosure of their use in inks for jet printing. U.S. Patent Application 2004-050291, European Patent Applications 1403337 and 1352754 and World Patent Application WO2004-018574 broadly disclose a wide variety of heterocyclic azo aminopyrazole dyes in inks for ink jet printing. Many of these dyes, however, still do not meet all of the criteria desirable in an ink jet ink.

PROBLEM TO BE SOLVED BY THE INVENTION

There remains a need to identify and select those dyes that are useful in producing a high quality image with good hue and improved light and ozone fastness. It would be most useful if these dyes performed well on porous media, swellable media and plain paper.

SUMMARY OF THE INVENTION

This invention provides an ink composition comprising a dye represented by Formula I:

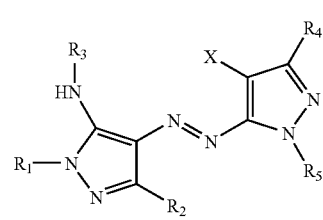

wherein:
  $R_1$ and $R_5$ independently are hydrogen or a substituted or unsubstituted alkyl, aromatic or heterocyclic group;
  $R_2$ and $R_4$ independently are hydrogen or a non-metallic substituent;

R3 is hydrogen or a substituted or unsubstituted alkyl, acyl, sulfonyl, aromatic or heterocyclic group;

and X is an electron withdrawing group;

with the proviso at least one of $R_1$, $R_2$, $R_3$, $R_4$ and $R_5$ comprises a group capable of imparting water solubility to the dye.

The dyes and inks of the invention have numerous advantages such as good hue, and light and ozone fastness. The dyes of this invention have desirable hue when printed on both porous and swellable media. The spectral curves of the dyes of this invention are broad but sharp cutting on the bathochromic side of the spectral curve, and have no unwanted secondary absorbance. The broad nature of the spectral curve of particular yellow examples of this invention is an advantage because, when combined with broadly absorbing magenta and cyan colorants, it results in reduced variability in response under different or changing illuminant sources. This results in more consistently pleasing colors and improved color reproduction in photographic ink jet applications. The dyes of this invention have superior light fastness and stability toward ozone compared with other dye classes, in particular when printed on porous silica or alumina based media. The dyes are also easy to manufacture. These and other advantages will be apparent from the detailed description below.

Full color ink jet printing normally employs a set of at least three primary inks—cyan, magenta and yellow. In addition, black, orange, red, blue and green inks and lower strength formulations of the primary inks may be used to provide improved image quality. Inks containing the yellow dyes of this invention may be used in combination with inks containing other dyes and pigments useful for ink jet printing. They may also be used with, inks containing polymers, stabilizers, antioxidants, gloss-control agents and the like.

DETAILED DESCRIPTION OF THE INVENTION

The inks of the invention comprise a dye represented by general Formula I:

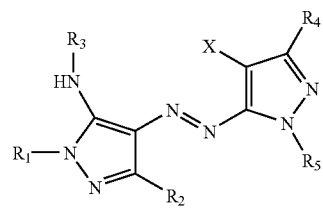

I $R_1$ is a hydrogen or a substituted or unsubstituted alkyl, aromatic or heterocyclic group. Preferably $R_1$ is a substituted or unsubstituted alkyl group of from 1 to about 6 carbons, a substituted or unsubstituted aromatic group of from 6 to about 10 carbons or a substituted or unsubstituted heterocylic group of 5 to about 10 atoms. Preferably $R_1$ is a methyl, ethyl, iso-propyl, tert-butyl, hydroxyethyl, methoxyethyl, methoxycarbonylmethyl, cyanoethyl, allyl, benzyl, phenyl, 4-sulfophenyl, 4-carboxyphenyl, 2,5-bis-sulfophenyl, naphth-2-yl, naphth-1-yl, 3,6-bis-sulfonaphth-1-yl or 2-pyridyl group. Even more preferably, $R_1$ may be a phenyl, 4-sulfophenyl, 4-carboxyphenyl, 2,5-bis-sulfophenyl or 2-pyridy group. It is preferred that $R_1$ is a substituted or unsubstituted aromatic or heterocyclic group.

$R_2$ is hydrogen or a non-metallic substituent. Preferably $R_2$ is a cyano, alkoxycarbonyl, carbamoyl, halogen, a carboxyl group, an acyl group, a nitro group, an alkyl or aryl sulfone, a sulfonic acid, a substituted or unsubstituted primary or secondary alkyl sulfonamide, a substituted or unsubstituted aryl sulfonamide, a substituted or unsubstituted alkyl group of from 1 to about 6 carbons, a substituted or unsubstituted aryl group of from 6 to about 10 carbons or a substituted or unsubstituted heterocylic group of 5 to about 10 atoms. More preferably, $R_2$ may be hydrogen, methyl, ethyl, iso-propyl, tert-butyl, benzyl, phenyl, or 2-pyridyl. Even more preferably, $R_2$ may be methyl or tert-butyl. It is preferred that $R_2$ is an alkyl or aromatic group.

$R_3$ is hydrogen or a substituted or unsubstituted alkyl, acyl, sulfonyl, aromatic or heterocyclic group. Preferably $R_3$ is hydrogen, a substituted or unsubstituted alkyl group of from 1 to about 6 carbons, an acyl group, a sulfonyl group, a substituted or unsubstituted aryl group of from 6 to about 10 carbons or a substituted or unsubstituted heterocylic group of 5 to about 10 atoms. More preferably, $R_3$ may be hydrogen, methyl, ethyl, iso-propyl, hydroxyethyl, methoxyethyl, methoxycarbonylmethyl, cyanoethyl, allyl, benzyl, phenyl, 4-sulfophenyl, 4-carboxyphenyl, 2,5-bis-sulfophenyl, naphth-2-yl, naphth-1-yl, 3,6-bis-sulfonaphth-1-yl, 2-pyridyl, 3-carboxypropionyl, 2-sulfobenzoyl or 3-carboxybenzenesulfonyl. Even more preferably, $R_3$ may be hydrogen, methyl, 3-carboxypropionyl, 2-sulfobenzoyl or 3-carboxybenzenesulfonyl. It is preferred that $R_3$ is hydrogen or a substituted or unsubstituted alkyl group $R_4$ independently represents hydrogen or a non-metallic substituent Preferably $R_4$ is hydrogen, cyano, alkoxycarbonyl, carbamoyl, halogen, a carboxyl group, an acyl group, a nitro group, an alkyl or aryl sulfone, a sulfonic acid, a substituted or unsubstituted primary or secondary alkyl sulfonamide, a substituted or unsubstituted aryl sulfonamide, a substituted or unsubstituted alkyl group of from 1 to about 6 carbons, a substituted or unsubstituted aryl group of from 6 to about 10 carbons or a substituted or unsubstituted heterocylic group of 5 to about 10 atoms. More preferably, $R_4$ may be hydrogen, methyl, ethyl, benzyl, phenyl, or 2-pyridyl. Even more preferably, $R_4$ may be hydrogen or methyl. It is preferred that $R_4$ is hydrogen or a substituted or unsubstituted alkyl or aromatic group.

$R_5$ independently represents hydrogen or a substituted or unsubstituted alkyl, aromatic or heterocyclic group. Preferably $R_5$ is a substituted or unsubstituted alkyl group of from 1 to about 6 carbons, a substituted or unsubstituted aryl group of from 6 to about 10 carbons or a substituted or unsubstituted heterocylic group of 5 to about 10 atoms. More preferably, $R_5$ may be methyl, ethyl, iso-propyl, tert-butyl, hydroxyethyl, methoxyethyl, methoxycarbonylmethyl, cyanoethyl, allyl, benzyl, phenyl, 4-sulfophenyl, 4-carboxyphenyl, 2,5-bis-sulfophenyl, naphth-2-yl, naphth-1-yl, 3,6-bis-sulfonaphth-1-yl or 2-pyridyl. Even more preferably, $R_5$ may be a group of the following formula:

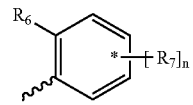

wherein $R_6$ is an ionizable group chosen from the following: hydroxy, sulfonate, sulfinate, carboxyl, substituted or unsubstituted sulfonamido, or phosphonate. $R_7$ may be H or any non-metallic group or any two of $R_7$ may be combined to form a 5- to 7-membered carbo- or heterocyclic, aromatic or alicyclic ring. n may be an integer from 0–4.

X may be any electron withdrawing group, defined as a substituent having a Hammett $\sigma_p$ value of greater than 0. Hammett constants are a measure of the electron withdrawing/donating propensity of a given substituent. For a further discussion of Hammett constants see J. March in "Advanced Organic Chemistry: Reactions, Mechanisms and Structure", (McGraw-Hill, 1968) pp 238–245. Typical electron withdrawing groups include, halogen, alkoxycarbonyl, cyano, nitro, alkylsulfonyl, carbamoyl, etc. More preferably, X is a substituent having a Hammett $\sigma_p$ value of greater than 0.2. Even more preferably, X is a substituent having a Hammett $\sigma_p$ value of greater than 0.4, such as cyano.

The dye must bear at least one polar or ionizable group that is capable of imparting water solubility to the dye. The dyes of the present invention must have adequate water solubility to enable preparation of an ink formulation containing between 0.2 and 10% dye. Typical water-solubilizing groups include sulfonic, sulfinic, carboxylic and phosphoric acids and their salts, phenolic hydroxyl, tetraalkylammonium, polyoxyalkylene, substituted or unsubstituted sulfonamido, etc. Preferably at least one of $R_1$, $R_2$, $R_3$, $R_4$ and $R_5$ comprises a sulfonic, sulfinic, phenolic hydroxyl, tetraalkylammonium, polyoxyalkylene or substituted or unsubstituted sulfonamido group or a carboxylic or phosphoric acid or their salts.

In one embodiment of the dye $R_1$ and $R_2$ are a substituted or unsubstituted alkyl or aromatic group; $R_3$ is hydrogen or a substituted or unsubstituted alkyl group; $R_4$ is hydrogen or a substituted or unsubstituted alkyl or aromatic group; X is carbamoyl, alkylsulfonyl, arylsulfonyl, nitro or cyano group; and $R_5$ is a group of the formula:

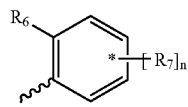

wherein $R_6$ is an ionizable group chosen from the following: hydroxyl, sulfonate, sulfinate, carboxyl, substituted or unsubstituted sulfonamido, or phosphonate; $R_7$ is independently H or any non-metallic group, or any two of $R_7$ may be combined to form a 5- to 7-membered carbo- or heterocyclic, aromatic or alicyclic ring; and n may be an integer from 0–4. Preferably $R_3$ is hydrogen; $R_4$ is hydrogen; and X is a cyano group.

In a preferred embodiment of the invention, $R_1$ is phenyl, 4-sulfophenyl, 4-carboxyphenyl, 2,5-disulfophenyl or 4,6-bis-(4-sulfoanilino)-1,3,5-triazin-2-yl. In another preferred embodiment of the invention, $R_2$ is hydrogen, methyl, tert-butyl or phenyl. In yet another preferred embodiment, $R_3$ is hydrogen, methyl, 3-carboxypropionyl, 2-sulfobenzoyl or 3-carboxybenzenesulfonyl. In still another preferred embodiment, $R_4$ is hydrogen or methyl. In another preferred embodiment, $R_5$ is 4-sulfophenyl, 2,5-disulfophenyl or 4,6-bis-(4-sulfoanilino)-1,3,5-triazin-2-yl.

Below are examples of dyes used in the invention. The dyes in the present invention include but are not limited to these examples. The dyes are shown with any acidic groups in their protonated form but any ionized form associated with a positive counterion of any type may be included. Typical counterions include $Na^+$, $K^+$, $Li^+$ and ammonium.

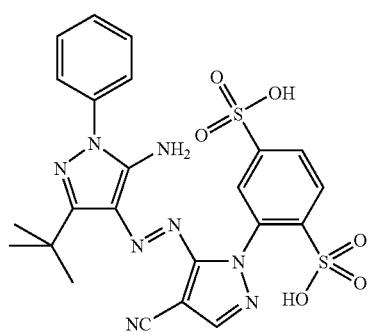

1

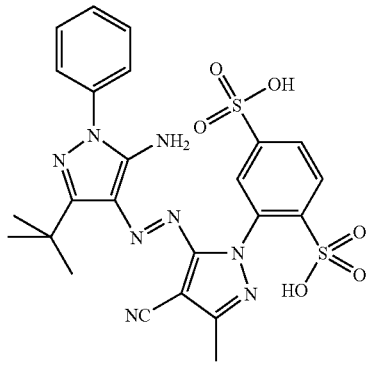

2

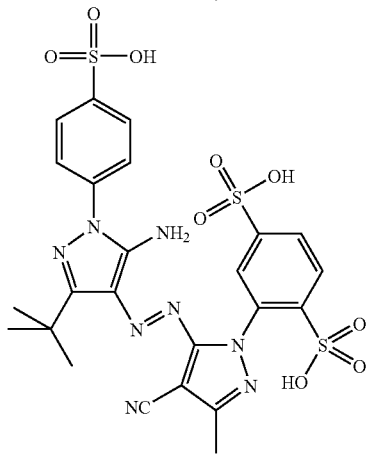

3

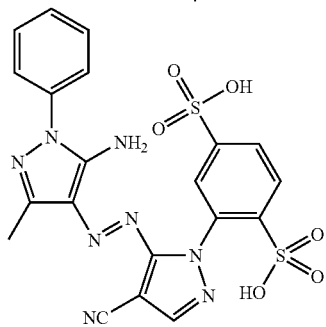

4

-continued
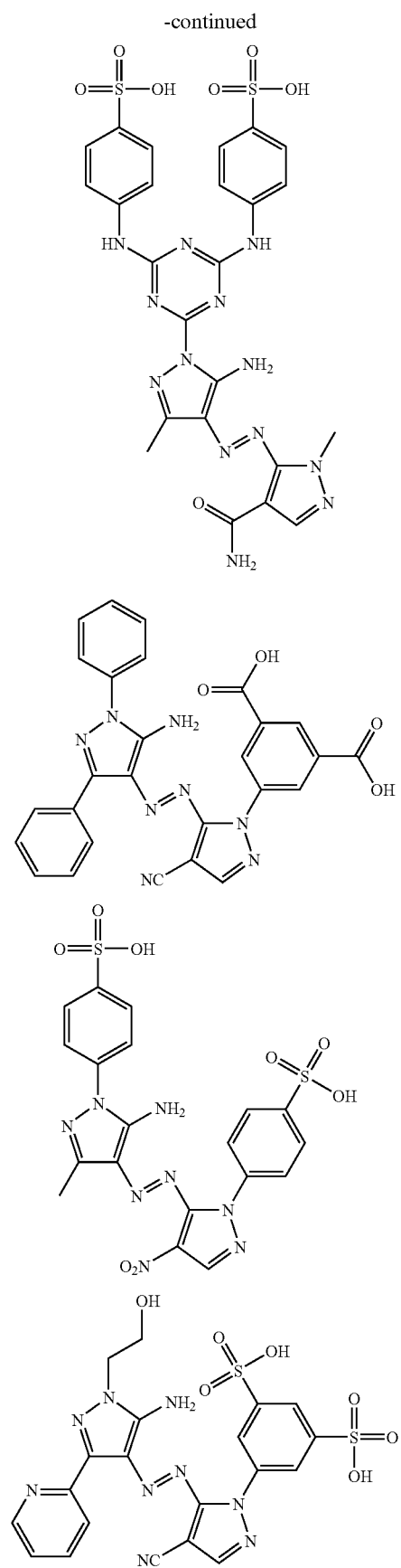
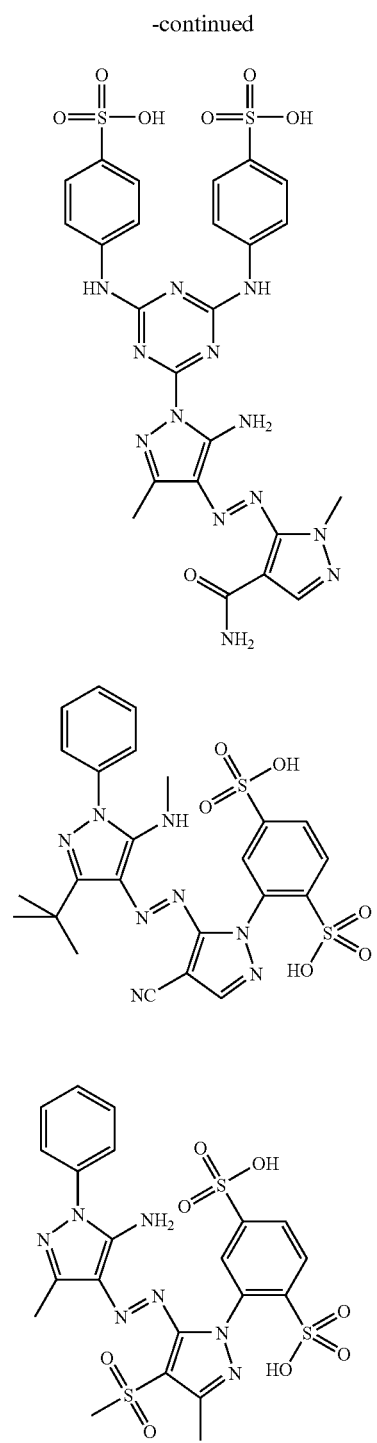

12
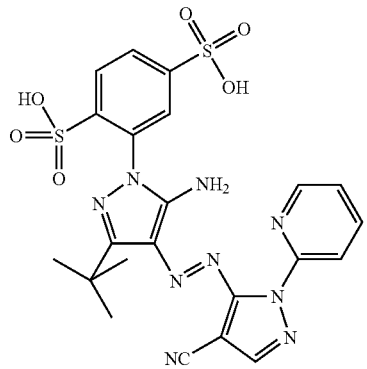
13
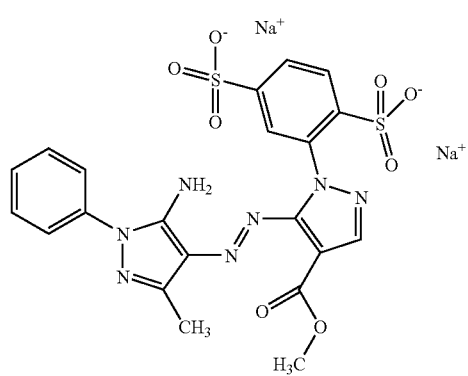
14
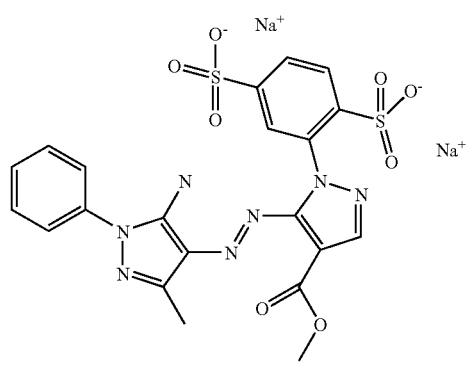
15
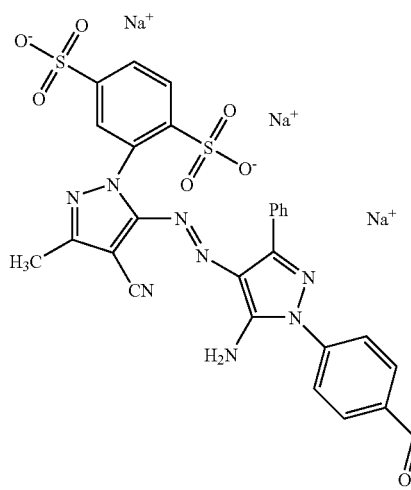
16
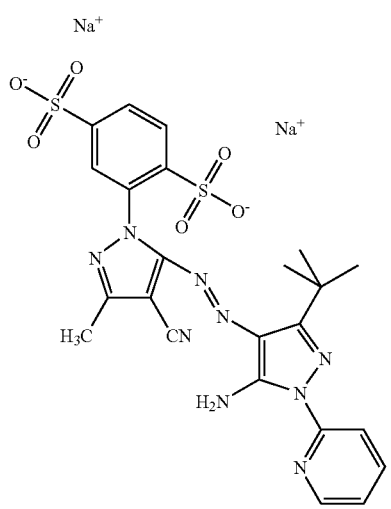

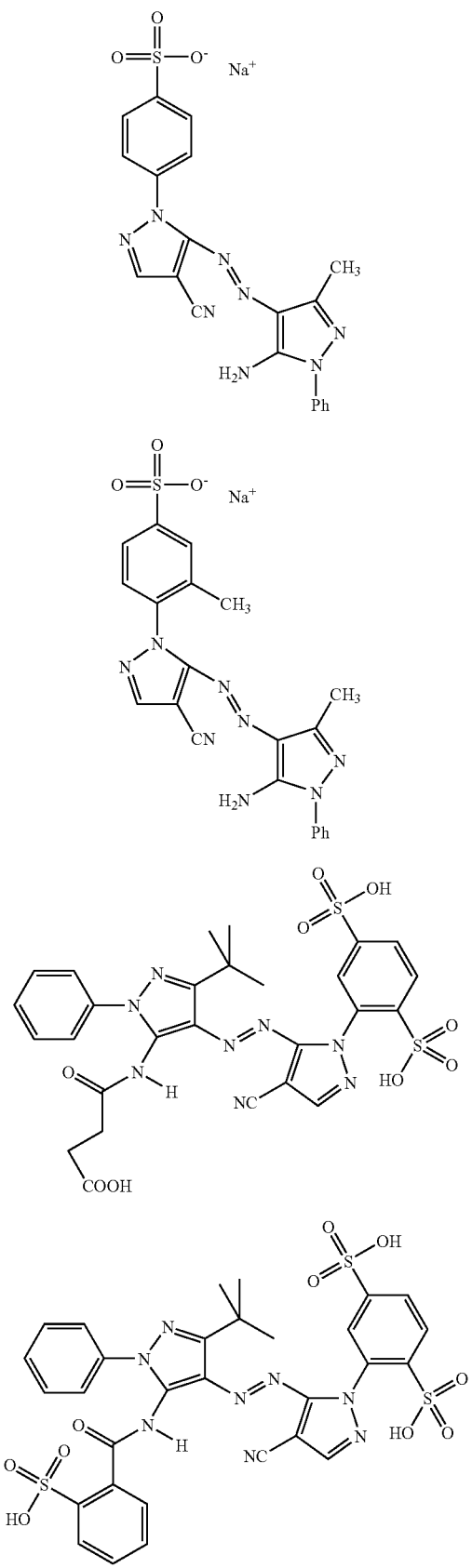
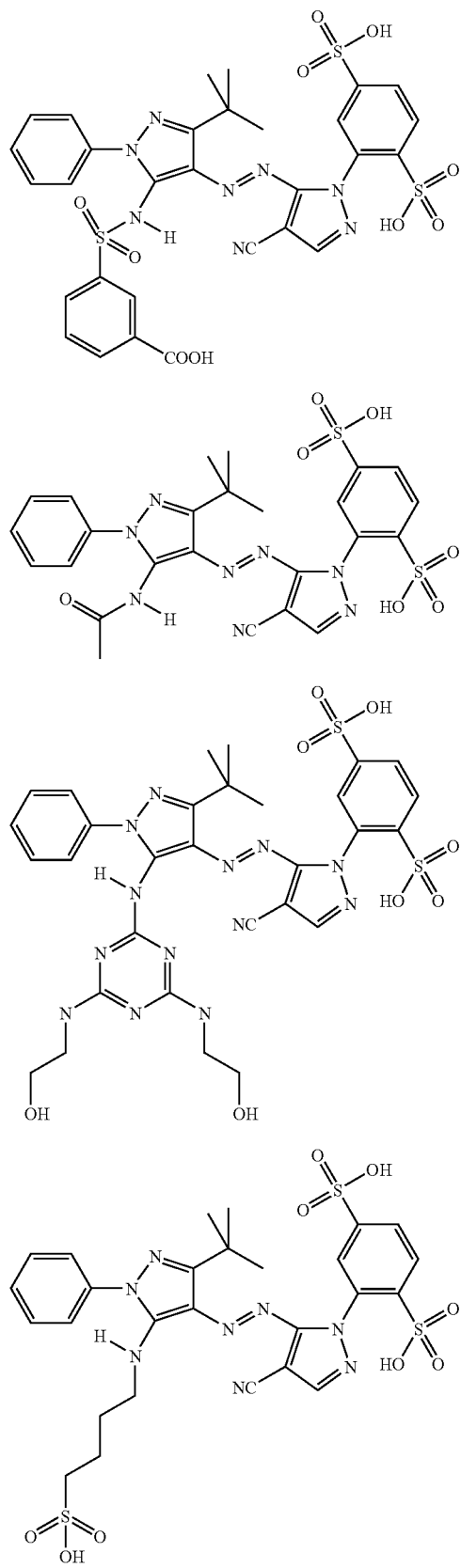

Unless otherwise specifically stated, use of the term "substituted" or "substituent" means any group or atom other than hydrogen. The substituent may be, for example, halogen, such as chlorine, bromine or fluorine; nitro; hydroxyl; cyano; carboxyl; or groups which may be further substituted, such as alkyl, including straight or branched chain or cyclic alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy)butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecyl-phenylcarbonylamino, p-tolylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzene-sulfonamido, N-methyltetradecylsulfonamido, N,N-dipropylsulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy) acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1-(N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituent groups may themselves be further substituted one or more times with the described substituent groups. The particular substituents used may be selected by those skilled in the art to attain the desired dye properties for a specific application and can include, for example, hydrophobic groups, solubilizing groups, blocking groups, and releasing or releasable groups. When a molecule may have two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents.

The ink of the invention may be utilized in any ink printing process. Although preferred for ink jet use, it also could be used for any printing or writing process using ink. Typical of such processes are pen plotters and pens. In general, the above dyes comprise from about 0.2 to about 8%, preferably from about 1 to about 5% by weight of the ink jet ink composition.

A humectant preferably is employed in the ink jet composition of the invention to help prevent the ink from drying out or crusting in the orifices of the printhead. Examples of humectants which can be used include polyhydric alcohols, such as ethylene glycol, diethylene glycol (DEG), triethylene glycol, propylene glycol, tetraethylene glycol, polyethylene glycol, glycerol, 1,5 pentanediol, 1,2-hexanediol, 2-ethyl-2-hydroxymethyl-1,3-propanediol (EHMP) 2-methyl-2,4-pentanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl, mono-ethyl ether or mono-butyl ether (TEGMBE), poly(ethylene glycol) monobutyl ether (PEGMBE), diethylene glycol di-methyl or di-ethyl ether, and diethylene glycol monobutylether; nitrogen-containing cyclic compounds, such as pyrrolidone, N-methyl-2-pyrrolidone, 1,3-dimethyl-2-imidazolidinone and urea; and sulfur-containing compounds such as dimethyl sulfoxide and tetramethylene sulfone. Preferred humectants for the inks of the invention include DEG, glycerol, DEGMBE, TEGMBE, 1,2-hexanediol, 1,5-pentanediol, urea, pyrrolidin-2-one, EHMP and mixtures thereof, because inks prepared with these humectants provide the best balance of physical properties. The humectant may be employed in each ink in an amount of from about 5 to about 60 weight percent of water miscible organic solvent. Percentages are based on the total weight of the aqueous carrier.

Water-miscible organic solvents may also be added to the aqueous ink of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic. Preferred surfactants include Surfynol® 465 (available from Air Products Corp.) and Tergitol® 15-S-5 (available from Union Carbide) because inks prepared with these surfactants provide the best balance of physical properties.

A biocide may be added to the composition of the invention to suppress the growth of micro-organisms such as molds, fungi, etc. in aqueous inks. A preferred biocide for the ink composition of the present invention is Proxel® GXL (Zeneca Specialties Co.) at a final concentration of 0.0001–0.5 wt. %

The pH of the aqueous ink compositions of the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

Inks containing the yellow dyes of this invention may be used in ink sets in combination with inks containing other dyes and pigments useful for ink jet printing. Dyes useful for ink jet printing are normally water soluble dyes of the Acid, Direct, Reactive or Basic Color Index classifications. Typically ink sets may comprise magenta and cyan inks along with the yellow ink, but may also include one or more black inks, lower strength (light) yellow, magenta and cyan inks and alternate color inks such as orange, red, blue, green, etc. Typical cyan dyes may be copper phthalocyanine derivatives such as Direct Blue 199 and 86; triarylmethane dyes such as Acid Blue 9; azo, metal-complex azo, metal-complex formazan or anthraquinone dyes. Typical magenta dyes may be xanthene dyes such as Acid Red 52; azo-naphthol dyes such as Acid Red 249, Direct Red 227 or Reactive Red 31; azo-aniline dyes; azo-thiazole dyes; arylazonaphthylamine dyes such as Direct Red 75 or Ilford M-377; metal-complex azo dyes such as Reactive Red 23, CAS Registry No. 347417-99-6 or any of the dyes described in U.S. Pat. No. 6,001,161; anthrapyridone dyes such as Acid Red 80 and 82; or anthraquinone dyes. Typical black dyes that are useful for ink jet printing include polyazo dyes such as Food Black 2, Direct Black 22 or Direct Black 19: metal-complex polyazo dyes such as Reactive Black 31, Pacified Reactive Black 31 or Ilford K-1334; sulfur black dyes or aniline black dyes.

The yellow dyes of this invention may also be mixed with other yellow dyes useful for ink jet printing such as Acid Yellow 17 or 23, Direct Yellow 86 or 132 or Ilford Y 307, etc. Inks comprising the yellow dyes of this invention may also be used in combination with pigmented ink jet inks or colorless inks comprising stabilizers, polymers, gloss-control agents or antioxidants etc. Typical pigments useful for ink jet printing include carbon black, metal phthalocyanines, diketopyrrolopyrroles, quinacridones, anthraquinones, perylenes, azo and disazo derivatives.

A typical ink composition of the invention comprises, for example, the following constituents by weight: colorant (0.2–8%), water (20–95%), a humectant (5–70%), water miscible solvents (2–20%), surfactant (0.1–10%), biocide (0.05–5%) and pH control agents (0.1–10%).

Additional additives which may optionally be present in the ink jet ink composition of the invention include thickeners, conductivity enhancing agents, anti-kogation agents, stabilizers, drying agents, and defoamers.

The ink jet inks provided by this invention may be employed in ink jet printing wherein liquid ink drops are applied in a controlled fashion to an ink receptive layer substrate, by ejecting ink droplets from a plurality of nozzles or orifices of the print head of an ink jet printer. The inks are suitable for use with any of the common ink jet heads for ejecting ink droplets in either drop-on-demand or continuous modalities.

The inks of the invention may be used with any ink jet receiver substrate. Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1. The inks may be used with plain paper as well as other receivers.

An ink jet recording element typically comprises a support having on at least one surface thereof an ink-receiving or image-receiving layer, and includes those intended for reflection viewing, which have an opaque support, and those intended for viewing by transmitted light, which have a transparent support.

In addition to plain paper, there are generally two types of ink-receiving layers (IRL's). The first type of IRL comprises a non-porous coating of a polymer with a high capacity for swelling and absorbing ink by molecular diffusion. Cationic or anionic substances are added to the coating to serve as a dye fixing agent or mordant for the cationic or anionic dye. This coating is optically transparent and very smooth, leading to a high glossy "photo-grade" receiver. The second type of IRL comprises a porous coating of inorganic, polymeric, or organic-inorganic composite particles, a polymeric binder, and additives such as dye-fixing agents or mordants. These particles can vary in chemical composition, size, shape, and intra-particle porosity. In this case, the printing liquid is absorbed into the open pores of the IRL to obtain a print which is instantaneously dry to the touch.

The inks of the invention may be particularly useful with porous receivers. An important characteristic of ink jet recording elements is their need to dry quickly after printing. To this end, porous recording elements provide nearly instantaneous drying as long as they have sufficient thickness and pore volume to effectively contain the liquid ink.

A glossy, porous IRL usually contains a base layer and a glossy image-receiving layer. When coated on plain paper, the base layer is laid down underneath the glossy image-receiving layer. In order to provide a smooth, glossy surface on the image-receiving layer, special coating processes are often utilized, such as cast coating and film transfer coating. For example, a porous recording element can be manufactured by cast coating, in which the particulate-containing coating is applied to a support and is dried in contact with a polished smooth surface. Calendering with heat and pressure is also used in combination with conventional blade, rod or air-knife coating on plain paper to produce gloss on the image-receiving layer.

The following examples are intended to illustrate, but not to limit, the present invention.

EXAMPLES

Preparation of Inventive Dye 1

To 10 g of cold concentrated sulfuric acid was added 0.9 g (0.013 moles) of solid sodium nitrite in portions over a period of ten minutes at 15–30° C. The mixture was then heated at ~70–380° C. until all solid reacts and dissolves. The mixture was cooled to <15° C. and 10 ml of a mixture of propionic and acetic acids (1:5 ratio) was added. The solution was further cooled to below 5° C. and 5.04 g (0.013 moles) of 1-(2,5-disulfophenyl)-4-cyano-5-aminopyrazole slurried in 15 ml of a 1:5 propionic-acetic acid mixture was added. The thick yellow-brown mixture was stirred for 2 hr at below 5° C. followed by the addition of 50 mg of urea to decompose any residual nitrous acid. The resulting solution of diazonium salt was added to a solution of 2.15 g (0.01 moles) of 1-phenyl-3-(t-butyl)-5-aminopyrazole in 25 ml of methanol. The solution was stirred cold for 2 hr and then diluted with 100 ml of cold water. The pH of the solution was adjusted to ~8 by the addition of NaOH and the resulting yellow solution extracted three times with 25 ml of ethyl acetate. The separated aqueous layer was acidified to pH 1 with concentrated HCl and ~30 g of sodium chloride was added. Upon stirring the dye precipitates as a bright yellow-orange solid which was isolated by filtration and rinsed with a 10% solution of sodium chloride and dried in vacuo at 50° C. The yield was 3.62 g of a fluffy orange yellow solid. (Th=6.15, 58.9%). The dye is readily soluble in water and has a lambda max of 436 nm.

Preparation of Inks

Ink I-1 containing inventive Dye 1 was prepared by dissolving 0.57 g dye, 1 g 1,5-pentanediol, 0.2 g 1,2-hexanediol, 0.6 g 2-pyrrolidinone, 0.04 g Tergitol 15-S-9 and 0.03 g Surfynol 465® (Air Products Co.) in enough water to give a total weight of 10 g. Ink I-2 was made in the same way except 0.52 g of inventive Dye 2 was used.

Comparative ink C-1 was prepared as above except dye 1 was replaced with 3.48 g of a 10% solution of Direct Yellow 132 (available as ProJet Yellow 1G from Avecia).

Printing of Test Images

The above inks were filtered through a 0.2 micron nylon membrane filter and loaded into separate, empty ink tanks designed for the Canon s520 printer. The filled ink tanks were placed in the appropriate carriage slot in a Canon s520 printer and a series of test images were printed onto a variety of commercial inkjet papers. The test images consisted of a series of patches with 0, 25, 50, 75 and 100% dot coverage of the test yellow ink. After drying for 24 hours at ambient temperature and humidity, the printed samples were subjected to image stability testing under a variety of conditions. These tests are described below. Typically the Status A blue density of the 100% dot coverage (or other) patch was recorded from a fresh sample using an X-Rite@ 820 densitometer. The sample was subjected to incubation and then re-read. The percentage of dye density remaining relative to the fresh sample was calculated, to give a measure of dye stability on a particular receiver. Higher numbers indicate greater stability.

Atmospheric Contaminants Test:

1. High Intensity

Printed samples were hung in a darkened chamber maintained at room temperature and with a constant atmosphere containing 5 ppm of ozone, and at a relative humidity of approximately 50% for 24 hr.

2. Low Intensity

Printed samples were hung in a room simulating an office environment for two weeks. The room was lit with low intensity (100–200 lux) fluorescent lighting and the temperature and humidity were maintained at approximately 70° F. and 50%. An ozone concentration of 60 ppb was maintained by the use of a commercial ozone generator.

High Intensity Simulated Daylight Fading Test:

Samples were mounted in a chamber where they were subjected to simulated daylight exposure at 50 Klux intensity from a xenon source for two weeks, and the percentage of dye remaining was calculated as above.

The following data show that inks containing the dyes employed in the invention yield more light stable images than closely related analogs.

TABLE

Retained dye as a percentage of original density.

| | | % Density Remaining After Incubation | | |
|---|---|---|---|---|
| Ink | Receiver | HI Daylight | HI Ozone | LO Ozone |
| I-1 | A | 99 | 100 | 98 |
| I-1 | B | 97 | 96 | 95 |
| I-1 | C | 100 | 100 | 97 |
| I-1 | D | 91 | 71 | 92 |
| I-2 | A | 99 | 100 | 99 |
| I-2 | B | 96 | 81 | 93 |
| I-2 | C | 98 | 99 | 100 |
| I-2 | D | 96 | 51 | 87 |
| C-1 | A | 96 | 100 | 100 |
| C-1 | B | 57 | 77 | 72 |
| C-1 | C | 97 | 100 | 99 |
| C-1 | D | 88 | 83 | 86 |

Receiver A = Kodak Ultima Picture Paper, B = Kodak Anytime Picture Paper, C = Kodak Premium Photo Glossy (wide format) and D = Hewlett-Packard Glossy Photo Paper (c7896a)
HI daylight = 50 Klux lamp for two weeks.
HI ozone = 5 ppm ozone concentration for 24 hrs.
LO ozone = 60 ppb ozone concentration for two weeks.

The data in the above Table demonstrate that the dyes of the invention exhibit excellent stability to both light and ozone. The invention has been described in detail with particular reference to certain preferred embodiments thereof, but it will be understood that variations and modifications can be effected within the spirit and scope of the invention.

What is claimed is:

1. A yellow ink jet ink composition for ink jet printing comprising a dye represented by Formula I, water and a humectant:

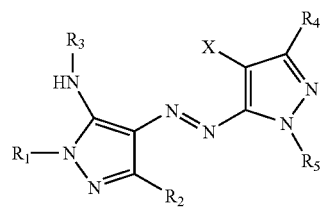

wherein:
$R_1$ is a hydrogen or a substituted or unsubstituted alkyl, aromatic or heterocyclic group;
$R_2$ and $R_4$ independently hydrogen or a non-metallic substituent;
$R_3$ is hydrogen or a substituted or unsubstituted alkyl, acyl, sulfonyl, aromatic or heterocyclic group;
$R_5$ is a substituted or unsubstituted alkyl, aromatic or heterocyclic group; and
X is an electron withdrawing group having a Hammet $\sigma_p$ value of 0.4 or greater; with the proviso at least one of $R_1$, $R_2$, $R_3$, $R_4$ and $R_5$ comprises a group capable of imparting water solubility to the dye.

2. The yellow ink composition of claim 1 wherein $R_1$ is a substituted or unsubstituted aromatic or heterocyclic group.

3. The yellow ink of claim 1 wherein $R_1$ is a phenyl, 4-sulfophenyl, 4-carboxyphenyl, 2,5-disulfophenyl or 4,6-bis-(4-sulfoanilino)-1,3,5-triazin-2-yl group.

4. The yellow ink composition of claim 1 wherein $R_2$ is a substituted or unsubstituted alkyl or aromatic group.

5. The yellow ink of claim 1 wherein $R_2$ is hydrogen, or a methyl, tert-butyl or phenyl group.

6. The yellow ink composition of claim 1 wherein $R_3$ is hydrogen or a substituted or unsubstituted alkyl group.

7. The yellow of claim 1 wherein $R_3$ is hydrogen, or a methyl, 3-carboxypropionyl, 2-sulfobenzoyl or 3-carboxybenzenesulfonyl group.

8. The yellow ink composition of claim 1 wherein $R_4$ is hydrogen or a substituted or unsubstituted alkyl or aromatic group.

9. The yellow ink composition of claim 1 wherein $R_4$ is hydrogen or methyl group.

10. The yellow ink of claim 1 wherein $R_5$ is a 4-sulfophenyl, 2,5-disulfophenyl or 4,6-bis-(4-sulfoanilino)-1,3,5-triazin-2-yl group.

11. The yellow ink composition of claim 1 wherein, $R_5$ is a group of the formula:

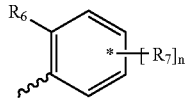

wherein $R_6$ is an ionizable group selected from the group consisting of hydroxyl, sulfonate, sulfinate, carboxyl, substituted or unsubstituted sulfonamido, and phosphonate; $R_7$ is independently H or any non-metallic group, or any two of $R_7$ may be combined to form a 5- to 7-membered carbo- or heterocyclic, aromatic or alicyclic ring; and n is an integer from 0–4.

12. The yellow ink composition of claim 1 wherein X is a carbamoyl, alkylsulfonyl, arylsulfonyl, nitro or cyano group.

13. The ink composition of claim 1 wherein at least one of $R_1$, $R_2$, $R_3$, $R_4$ and $R_5$ comprises a sulfonic, sulfinic, phenolic hydroxyl, tetraalkylammonium, polyoxyalkylene or substituted or unsubstituted sulfonamido group or a carboxylic or phosphoric acid or their salts.

14. The ink of claim 2 wherein $R_2$ is a substituted or unsubstituted alkyl or aromatic group; $R_3$ is hydrogen or a substituted or unsubstituted alkyl group; $R_4$ is hydrogen or a substituted or unsubstituted alkyl or aromatic group; X is carbamoyl, alkylsulfonyl, arylsulfonyl, nitro or cyano; and $R_5$ is a group of the formula:

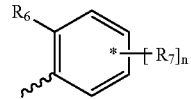

wherein $R_6$ is an ionizable group selected from the group consisting of hydroxyl, sulfonate, sulfinate, carboxyl, substituted or unsubstituted sulfonamido, and phosphonate; $R_7$ is independently H or any non-metallic group, or any two of $R_7$ may be combined to form a 5- to 7-membered carbo- or heterocyclic, aromatic or alicyclic ring; and n is an integer from 0–4.

15. The ink of claim 14 wherein $R_3$ is hydrogen; $R_4$ is hydrogen; and X is a cyano group.

16. The ink composition of claim 1 wherein said dye has adequate water solubility to enable preparation of an ink formulation containing between 0.2% and 10% dye by weight.

17. The ink of claim 1 wherein the humectant is ethylene glycol, glycerol, diethylene glycol, 2-pyrrolidinone, 1,2-hexanediol, 1,5-pentanediol or polyethylene glycol.

18. A set of inks for ink jet printing comprising a yellow ink according to claim 1, a magenta ink and a cyan ink.

19. The ink set of claim 18 additionally comprising a black ink.

20. The ink set of claim 18 additionally comprising one or more of a red, orange, green or blue ink.

21. The ink set of claim 18 additionally comprising one or more of a lower strength black, cyan, magenta or yellow ink.

22. The ink set of claim 19 additionally comprising one or more of a red, orange, green or blue ink.

23. The ink set of claim 19 additionally comprising one or more of a lower strength black, cyan, magenta or yellow ink.

24. The ink set of claim 18 additionally comprising a colorless ink comprising one or more of a polymer, stabilizer, gloss-control agent or antioxidant.

25. The ink set of claim 19 additionally comprising a colorless ink comprising one or more of a polymer, stabilizer, gloss-control agent or antioxidant.

26. The ink set of claim 20 additionally comprising a colorless ink comprising one or more of a polymer, stabilizer, gloss-control agent or antioxidant.

27. The ink set of claim 21 additionally comprising a colorless ink comprising one or more of a polymer, stabilizer, gloss-control agent or antioxidant.

28. The ink set of claim 22 additionally comprising a colorless ink comprising one or more of a polymer, stabilizer, gloss-control agent or antioxidant.

29. The ink set of claim 23 additionally comprising a colorless ink comprising one or more of a polymer, stabilizer, gloss-control agent or antioxidant.

* * * * *